United States Patent
Krom et al.

[11] Patent Number: 5,341,701
[45] Date of Patent: Aug. 30, 1994

[54] STEERING GEAR FOR MOTOR VEHICLE

[75] Inventors: Lynn C. Krom, Bay City; Duane K. Dye, Saginaw, both of Mich.

[73] Assignee: General Motors Corporation, Detroit, Mich.

[21] Appl. No.: 73,868

[22] Filed: Jun. 9, 1993

[51] Int. Cl.⁵ .................... B62D 3/08; F16H 55/28
[52] U.S. Cl. ............................. 74/499; 74/440
[58] Field of Search ................... 74/440, 498, 499

[56] References Cited

U.S. PATENT DOCUMENTS

| | | | |
|---|---|---|---|
| 2,916,945 | 12/1959 | Rittenhouse et al. | 74/499 |
| 2,936,643 | 5/1960 | Smith et al. | 74/409 |
| 2,964,967 | 12/1960 | Osborne | 74/498 |
| 3,665,783 | 5/1972 | Arnold | 74/498 |
| 3,805,634 | 4/1974 | White | 74/441 |
| 4,217,811 | 8/1980 | Dzioba et al. | 91/375 |
| 4,228,696 | 10/1980 | Jablonsky | 74/499 |
| 5,138,896 | 8/1992 | Elser et al. | 74/499 |

*Primary Examiner*—Allan D. Herrmann
*Attorney, Agent, or Firm*—Saul Schwartz

[57] ABSTRACT

An integral steering gear for a motor vehicle includes a plunger supported on a pitman shaft of the steering gear for linear bodily movement in a plane perpendicular to the centerline of the pitman shaft and a leaf spring between the plunger and the pitman shaft biasing the plunger into engagement on a rack piston of the steering gear. The plunger urges the pitman shaft and rack piston in relative separation to eliminate linear clearance between a housing of the steering gear and each of the rack piston and pitman shaft. The plunger also urges the rack piston to limited rotation whereby straight rack gear teeth on the rack piston are wedged against straight sector gear teeth on a sector of the pitman shaft to eliminate angular clearance between the teeth.

3 Claims, 3 Drawing Sheets

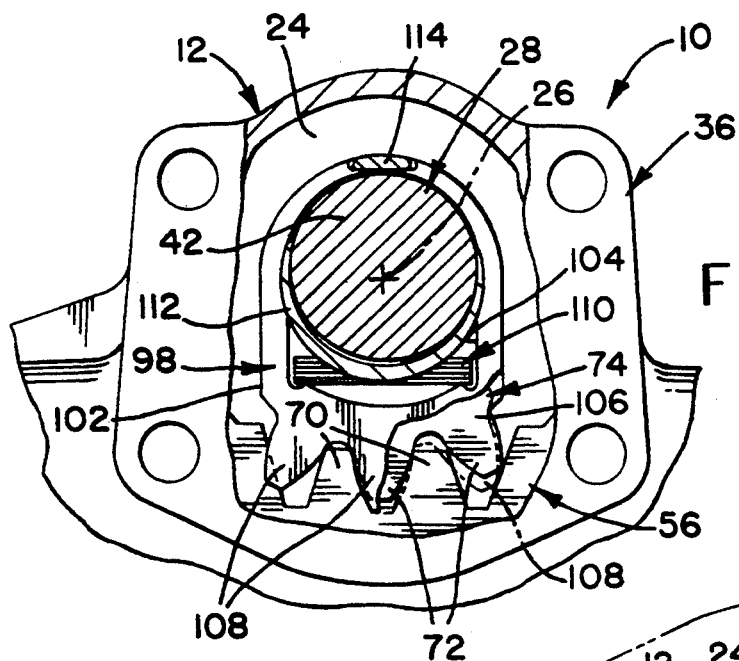
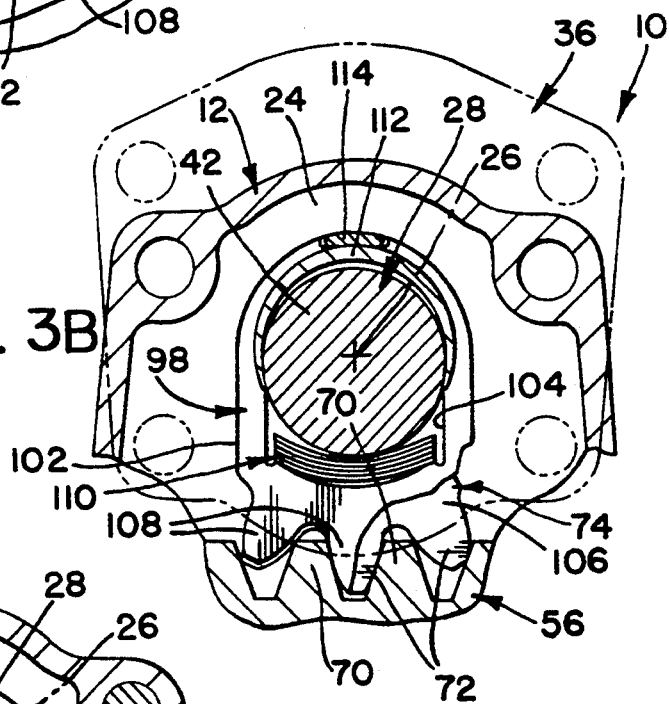
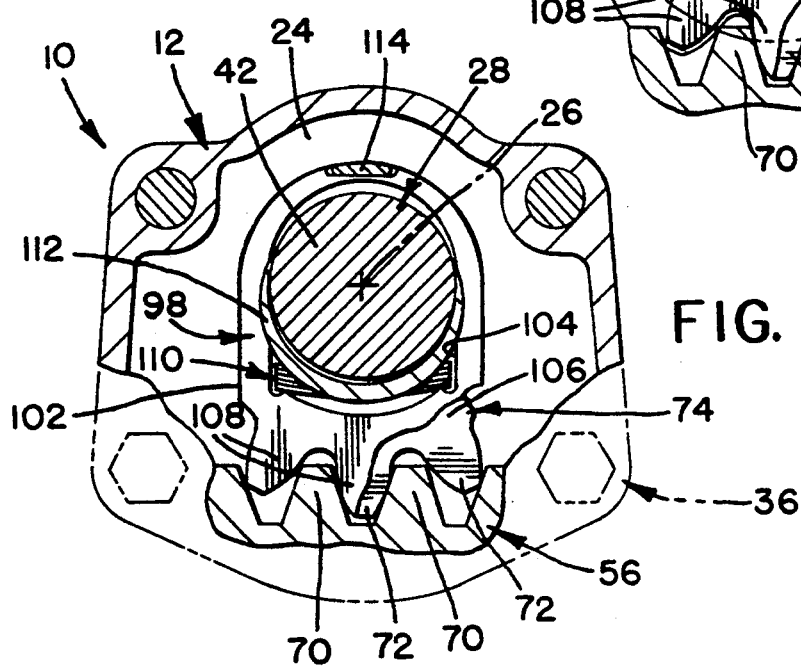
FIG. 3A
FIG. 3B
FIG. 3C

STEERING GEAR FOR MOTOR VEHICLE

FIELD OF THE INVENTION

This invention relates to motor vehicle steering gears.

BACKGROUND OF THE INVENTION

In motor vehicle steering gears commonly referred to as "integral gears", a worm shaft of the gear is connected to the vehicle's steering wheel for unitary rotation therewith and a pitman shaft of the gear is connected to steering linkage such that rotation of the pitman shaft effects linear displacement of the linkage. Gear teeth on a recirculating ball nut on the worm shaft mesh with gear teeth on a sector on the pitman shaft to effect concurrent rotation of the worm and pitman shafts. In power assisted integral gears, the ball nut is referred to as a "rack piston" because it also functions as a piston of a fluid motor. Several proposals have been advanced to remove tooth clearance or "lash" between the gear teeth on the ball nut and on the sector, including rotating or rolling the ball nut about the centerline of the worm shaft to wedge portions of the teeth thereon into corresponding portions of the sector gear teeth. U.S. Pat. No. 3,810,399, issued 14 May 1974 and assigned to the assignee of this invention, is representative. A motor vehicle steering gear according to this invention is an improvement over the integral gear described in the aforesaid U.S. Pat. No. 3,810,399.

SUMMARY OF THE INVENTION

This invention is a new and improved motor vehicle integral steering gear having a housing, a worm shaft rotatably supported on the housing, a pitman shaft rotatably supported on the housing, a recirculating ball nut on the worm shaft shiftable linearly along and rotatable in limited fashion about the centerline of the worm shaft, and meshing gear teeth on the ball nut and on a sector of the pitman shaft for rotating the pitman shaft concurrently with the worm shaft. A plunger is rotatable with the pitman shaft and supported thereon for bodily movement toward and away from the ball nut in a plane perpendicular to a centerline of the pitman shaft. A spring biases the plunger toward the ball nut. When the ball nut and pitman shaft are in center positions corresponding to straight ahead driving, the plunger reacts against the ball nut such that the ball nut and the pitman shaft are urged in opposite linear directions and the ball nut is rotated or rolled about the centerline of the worm shaft. Linear separation between the ball nut and worm shaft eliminates side clearances between the steering gear housing and each of the ball nut and the pitman shaft. Rotation of the ball nut wedges portions of the gear teeth thereon into corresponding portions of the sector gear teeth to eliminate lash. In a preferred embodiment, the integral steering gear is power assisted and the ball nut is a rack piston of a power assist fluid motor.

BRIEF DESCRIPTION OF THE DRAWINGS

FIGS. 3A-3C are fragmentary, broken-away views taken generally along the plane indicated by lines 3—3 in FIG. 2 illustrating a sequence of assembly steps for the steering gear according to this invention.

DESCRIPTION OF A PREFERRED EMBODIMENT

Figure 1:
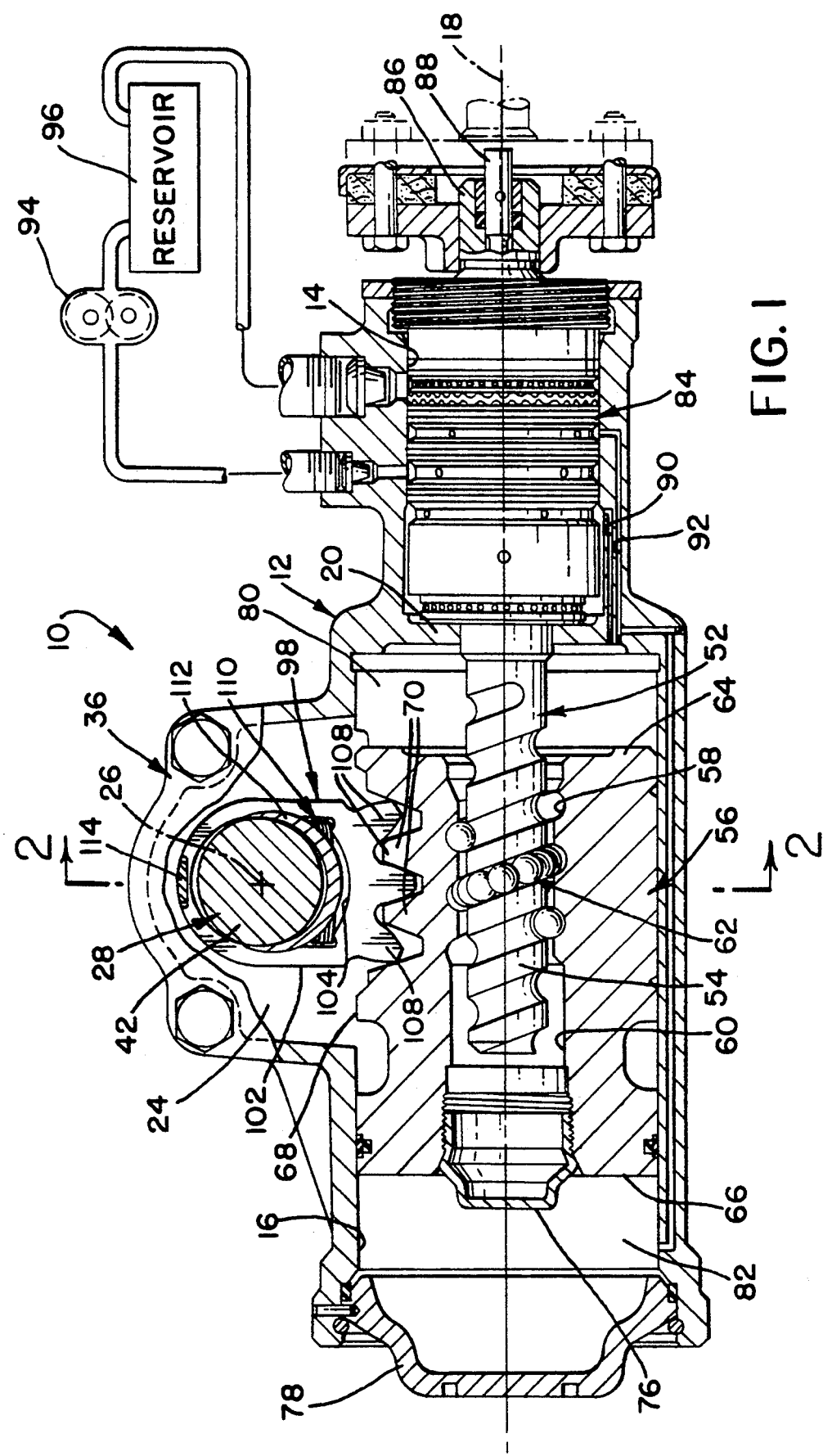
FIG. 1 is a broken-away plan view of a motor vehicle steering gear according to this invention.
Figure 2:
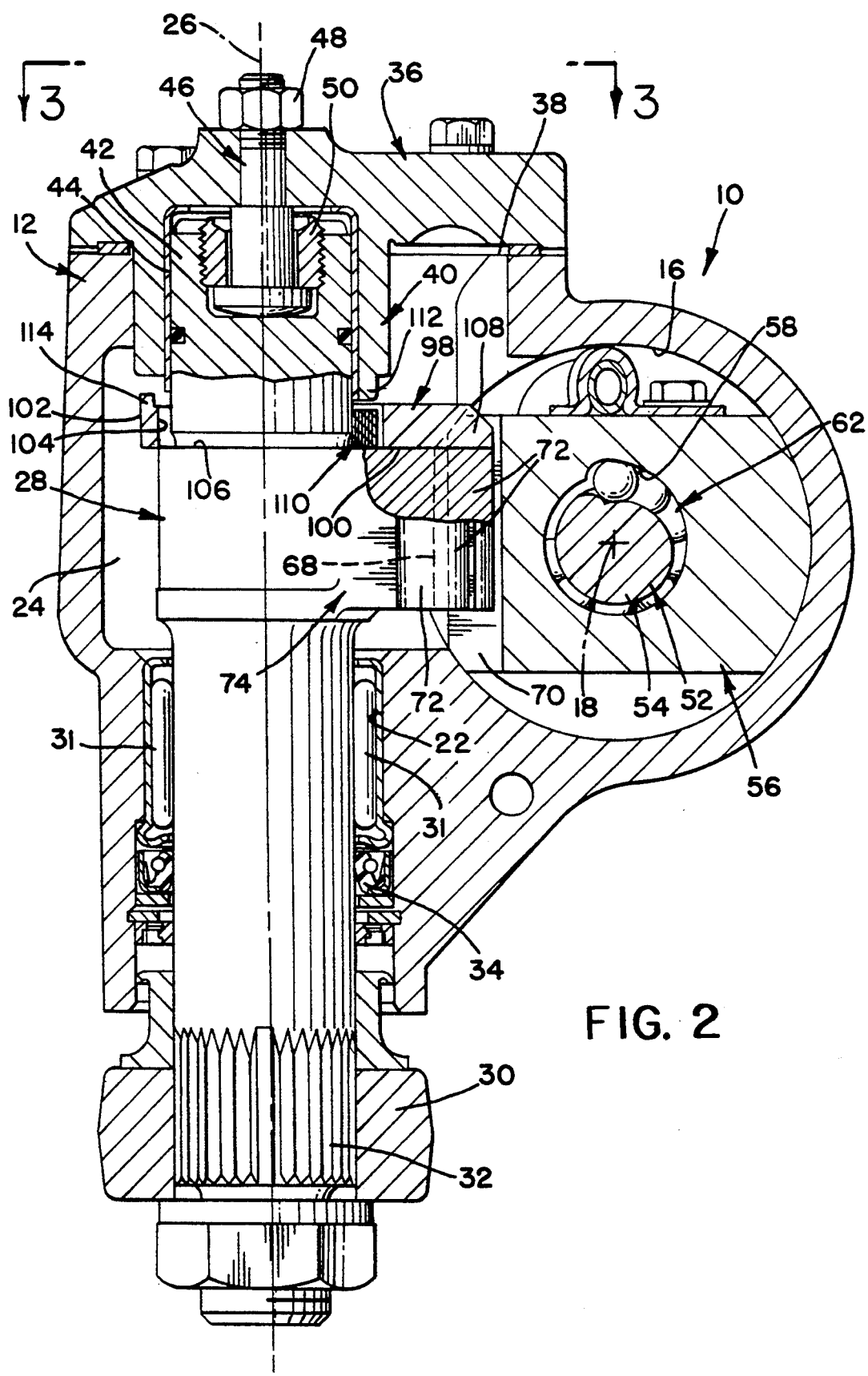
FIG. 2 is a sectional view taken generally along the plane indicated by lines 2—2 in FIG. 1.

Referring to FIGS. 1 and 2, a motor vehicle steering gear 10 according to this invention, in a power assisted embodiment, includes a housing 12 having a cylindrical valve bore 14 and a cylindrical rack piston bore 16, each symmetric about a first centerline 18 of the housing. An integral partition of the housing separates the rack piston bore from the valve bore. A cylindrical pitman shaft bore 22 in the housing opens into a sector chamber 24 of the housing and is symmetric about a second centerline 26 of the housing perpendicular to the first centerline 18 but spaced laterally therefrom.

A pitman shaft 28 of the gear 10 is supported on the housing 12 for rotation about the second centerline 26 by a plurality of needle bearings 31 between the bore 22 and the pitman shaft. A fragmentarily illustrated pitman arm 30 is rigidly attached to a serrated end 32 of the pitman shaft below the housing 12, FIG. 2. The pitman arm is connected to steering linkage, not shown, of the motor vehicle whereby the vehicle is steered in conventional fashion by back and forth rotation of the pitman shaft about the centerline 26. A seal 34 between the housing 12 and the pitman shaft prevents leakage of fluid from the sector chamber.

A first cover 36 of the steering gear is bolted to the housing 12 over a circular open end 38 of the sector chamber 24. The first cover has an annular boss 40 symmetric about the second centerline 26. An upper end 42 of the pitman shaft is supported in the boss 40 by a sleeve bearing 44 for rotation about the second centerline 26. A headed stud 46 for adjusting the position of the pitman shaft in the direction of the second centerline is clamped to the cover 36 by a nut 48. A screw threaded insert 50 on the pitman shaft prevents dislodgement of the head of the stud from the shaft. The pitman shaft is rotatable about the second centerline relative to the stud 46.

A worm shaft 52 of the steering gear is supported on the partition 20 for rotation about the first centerline 18 and includes a screw threaded shaft portion 54 in the rack piston bore 16 and a driving portion, not shown, in the valve bore. A cylindrical rack piston 56 of the steering gear is disposed in the rack piston bore 16 for linear bodily movement in the direction of, and for limited rotation about, the first centerline 18. An internal screw thread 58 in a bore 60 of the rack piston engages the screw thread on the shaft portion 54 of the worm shaft through a low-friction, recirculating ball system 62 whereby rotation of the worm shaft effects concurrent linear displacement of the rack piston in the direction of the first centerline 18.

The rack piston 56 has a first end 64, a second end 66 and a planar wall 68 facing the sector chamber 24. A plurality of straight rack gear teeth 70 extending generally parallel to the second centerline 26 are formed on the planar wall 68. The rack gear teeth mesh with a corresponding plurality of straight sector gear teeth 72 on a sector 74 of the pitman shaft 28 located in the sector chamber 24 of the housing. Linear displacement of the rack piston in the direction of the first centerline 18 effects concurrent rotation of the pitman shaft about the second centerline 26.

A plug 76 seals the end of the bore 60 in the rack piston 56. A second cover 78 on the housing 12 seals the end of the rack piston bore 16 facing the plug 76. A first working chamber 80 of a steering assist fluid motor is defined in the housing 12 between the first end 64 of the rack piston 56 and the partition 20. A second working chamber 82 of the steering assist fluid motor is defined in the bore 16 between the second cover 78 and the second end 66 of the rack piston. The first working chamber 80 communicates with the sector chamber 24 but is separated from the second working chamber 82 by the rack piston.

A conventional rotary control valve 84 in the valve bore 14 includes a sleeve, not shown, rotatable as a unit with the driving portion of the worm shaft 52, a spool, not shown, rotatable as a unit with an input shaft 86 of the gear connected to the manual steering wheel, not shown, of the vehicle, and a torsion bar 88 rigidly connected at one end to the input shaft 86 and at the other end to the driving portion of the worm shaft 52. The first working chamber 80 is connected to the valve bore 14 by a passage system 90. The second working chamber 82 is connected to the valve bore 14 by a passage system 92.

The valve 84 connects a pump 94 to one or the other of the working chambers 80, 82 and a reservoir 96 to the other in accordance with angular displacement of the spool relative to the sleeve. For a complete description of a representative rotary control valve, reference may be made to U.S. Pat. No. 3,022,772, issued 27 February 1962 and assigned to the assignee of this invention.

The steering gear 10 further includes a flat plunger 98 having a planar side 100, an outer edge 102 around the plunger, and an inner edge 104 around a perforation or window in the plunger. The planar side 100 of the plunger bears against a flat upper side 106 of the sector 74. The pitman shaft projects through the window in the plunger with clearance between the inner edge 104 and the shaft. Accordingly, the plunger 98 is supported on the pitman shaft for linear movement relative to the shaft in a plane perpendicular to the centerline 26 and for rotation relative to the shaft in the same plane.

A plurality of gear teeth 108 corresponding to the sector gear teeth 72 are formed in the outer edge 102 of the plunger 98. The gear teeth 108 mesh with the rack gear teeth 70 on the rack piston 56 above the sector gear teeth 72 to effect unitary rotation of the plunger 98 and the pitman shaft about the second centerline 26. Because the pitman shaft is rotatable relative to the plunger, no torque is transferred from the rack piston to the pitman shaft through the plunger.

A leaf spring 110 is disposed in beam bending between the pitman shaft and the plunger 98. The distal ends of the leaf spring 110 bear against a pair of raised bosses on the inner edge 104 of the plunger. Between its distal ends, the leaf spring 110 reacts against the pitman shaft whereby the spring biases the plunger radially out relative to the centerline 26 toward the rack piston 56.

The plunger 98 functions in two clearance eliminating modes. First, the force reactions of spring 110 on the plunger and on the pitman shaft thrust the rack piston 56 and the pitman shaft 28 in opposite directions perpendicular to the centerline 26. Accordingly, manufacturing tolerance induced side clearance between the rack piston and the rack piston bore 16, which may be on the order of 0.007–0.008 inch, and between the pitman shaft and the pitman shaft bore 22, which may be on the order of 0.001–0.002 inch, are removed.

Second, because the plunger 98 engages the rack piston 56 above the first centerline 18, the force reaction of the plunger on the rack piston rotates or rolls the rack piston clockwise, FIG. 2, about the first centerline 18 whereby the lower portions of the straight rack gear teeth 70 are wedged into the lower portions of the straight sector gear teeth 72. As described in the aforesaid U.S. Pat. No. 3,810,399, such wedging between rack gear teeth and sector gear teeth eliminates lash in center positions of the rack piston and the pitman shaft, FIG. 1, corresponding to straight ahead driving. On either side of the center positions, the teeth 70, 72 are maintained in lash-free relationship by torque transfer.

Referring to FIGS. 3A–3C, a crescent shaped cam 112 on the bottom of the annular boss 40 on the cover 36 cooperates with a raised follower 114 on the plunger 98 to retract the plunger against the spring 110 to permit the pitman shaft to achieve a fully installed position, FIG. 2, in the housing. Otherwise, the spring 110 biases the plunger to an extreme outward position, FIG. 3A, wherein the gear teeth 108 on the plunger overlap the sector gear teeth 72 and interfere with the tops of the rack gear teeth to block the pitman shaft from achieving its fully installed position.

To retract the plunger 110, the cover 36 is rotated relative to the pitman shaft about the second centerline 26 through an interval of approximately 180 degrees from an installed or normal position, FIG. 3A, to a temporary holding position shown in broken lines in FIG. 3B. Concurrently, the crescent-shaped cam 112 on the boss 40 engages the follower 114 and linearly shifts the plunger 98 radially inward relative to the centerline 26 against the spring 110.

In the holding position of the cover 36, the gear teeth 108 on the plunger are inboard of the sector gear teeth 72, FIG. 3B. In that circumstance, the teeth 108 do not interfere with the tops of the rack gear teeth 70 so that the pitman shaft 28 penetrates the pitman shaft bore 22 to its fully installed position. The cover 36 is thereafter rotated back to its normal position, FIG. 3C, and bolted to the housing 12.

The embodiments of the invention in which an exclusive property or privilege is claimed are defined as follows:

1. In a motor vehicle steering gear of the type including
   a housing,
   a worm shaft supported on said housing for rotation about a first centerline of said housing,
   a cylindrical rack piston supported on said housing for bodily movement along and limited rotation about said first centerline,
   screw thread means connecting said worm shaft to said rack piston such that rotation of said worm shaft effects concurrent bodily movement of said rack piston in the direction of said first centerline, and
   a pitman shaft supported on said housing for rotation about a second centerline of said housing perpendicular to said first centerline and laterally offset therefrom,
   the combination comprising:
   means defining a plurality of straight rack gear teeth on a planar wall of said rack piston generally parallel to said second centerline,
   means defining a plurality of straight sector gear teeth on said pitman shaft generally parallel to said second centerline meshing with said rack gear teeth so that bodily movement of said rack piston along said first centerline in opposite directions from a center position thereof corresponding to straight ahead driving effects concurrent rotation of said pitman shaft about said second centerline in opposite directions from a center position thereof corresponding to straight ahead driving, a flat plunger, means mounting said plunger on a planar surface of said pitman shaft for bodily movement relative thereto in a plane perpendicular to said second centerline and spaced apart from said first centerline and for rotation relative to said pitman shaft in said plane perpendicular to said second centerline, and a leaf spring between said plunger and said pitman shaft biasing said plunger radially outward relative to said second centerline so that an outer edge of said plunger bears against said rack piston whereby said rack piston and said pitman shaft in said center positions thereof are urged in opposite linear directions against said housing to remove side clearance and said rack piston is rotatably biased about said first centerline to wedge said rack gear teeth against said sector gear teeth to remove lash therebetween.

2. The motor vehicle steering gear recited in claim 1 further including:

means defining a plurality of gear teeth in said outer edge of said plunger corresponding in shape to said sector gear teeth on said pitman shaft and biased into engagement with said rack gear teeth on said rack piston by said leaf spring.

3. The motor vehicle steering gear recited in claim 2 further including:

means defining a cam follower on said plunger, a cam, and means supporting said cam on said steering gear housing for rotation about said second centerline between a normal position remote from said cam follower and a holding position engaging said cam follower and retracting said plunger against said leaf spring to a position wherein said gear teeth on said plunger are disposed inboard of said sector gear teeth on said pitman shaft.

* * * * *